(12) United States Patent
Fennety (10) Patent No.: US 12,028,227 B2
(45) Date of Patent: *Jul. 2, 2024

(54) METHODS AND DEVICES FOR IMPROVED PERCENTILE EXTRACTION OF NETWORK MONITORING DATA

(71) Applicant: Accedian Networks Inc., Saint-Laurent (CA)

(72) Inventor: Patrick Fennety, Notre-Dame-de-l'Ile-Perrot (CA)

(73) Assignee: ACCEDIAN NETWORKS INC., Saint-Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,946

(22) Filed: May 18, 2023

(65) Prior Publication Data
US 2023/0336445 A1 Oct. 19, 2023

Related U.S. Application Data

(63) Continuation of application No. 17/720,943, filed on Apr. 14, 2022, now Pat. No. 11,695,662.

(51) Int. Cl.
*H04L 43/045* (2022.01)
*H04L 43/062* (2022.01)
*H04L 43/0852* (2022.01)

(52) U.S. Cl.
CPC .......... *H04L 43/045* (2013.01); *H04L 43/062* (2013.01); *H04L 43/0852* (2013.01)

(58) Field of Classification Search
None
See application file for complete search history.

(56) References Cited

U.S. PATENT DOCUMENTS

| | | | |
|---|---|---|---|
| 9,961,094 B1 | 5/2018 | Sanders et al. | |
| 10,909,177 B1* | 2/2021 | Rudish | G06F 16/901 |
| 2020/0169479 A1* | 5/2020 | Ireland | H04L 47/6215 |
| 2022/0064594 A1* | 3/2022 | Harrington | C12N 5/0612 |

* cited by examiner

*Primary Examiner* — Anh Nguyen (57) ABSTRACT

Described are various embodiments of a device and method for computing statistics of various network monitoring metrics. In one embodiment, the method includes constructing a first histogram of network traffic monitoring data acquired over a designated sampling period from said network; identifying one or more bins of said first histogram comprising each at least one of one or more desired percentile values; for each identified bin: building a second histogram centered on said identified bin, said second histogram comprising a second bin size that is smaller than said first bin size; calculating one or more bins of said second histogram comprising each at least one of said one or more desired percentile values and the values associated therewith; and converting said values associated therewith into percentile values representative of the range defined between said lower order of magnitude to said higher order of magnitude.

19 Claims, 4 Drawing Sheets

METHODS AND DEVICES FOR IMPROVED PERCENTILE EXTRACTION OF NETWORK MONITORING DATA

CROSS REFERENCE TO RELATED APPLICATIONS

This application is a continuation of U.S. patent application Ser. No. 17/720,943, filed Apr. 14, 2022, now allowed, which is hereby incorporated by reference in its entirety.

FIELD OF THE INVENTION

The present invention relates to network monitoring, and more particularly to methods and devices for improved percentile extraction of network monitoring data.

BACKGROUND

Digital services provided over a network often depend on the availability and performance of that network. For this reason, monitoring of different computer networks and the services provided thereby is of a primordial importance. Monitoring is often done by acquiring a range of network monitoring data and computing statistics that offer a quick and clear indication of the overall performance of the network.

One type of statistics that is often useful to assess the performance of a network or/and services provided via said network is the percentile values of different performance metrics. These are typically noted using the capital number P (e.g., P50 is the median, P95 is the 95th percentile) and may be used to quickly assess the data distribution of various packet-related metrics, for example round-trip times, one-way delays or two-way delays. However, generating or computing such percentile values at a high temporal resolution (of the order of 1 µs for example) but with data samples comprising values spawning multiple orders of magnitude (from 1 µs to 1 second for example) is challenging. In addition, such statistics are usually computed on network monitoring devices coupled or connected to the network which typically rely of specialized hardware, for example Field Programmable Gate Arrays (FPGAs) that have limited computational power and/or memory. In addition, another problem is that such computations cannot take too long since these statistics are provided to the network provider or administrator, or service provider, in a near-real-time fashion.

SUMMARY

The following presents a simplified summary of the general inventive concept(s) described herein to provide a basic understanding of some aspects of the disclosure. This summary is not an extensive overview of the disclosure. It is not intended to restrict key or critical elements of the embodiments of the disclosure or to delineate their scope beyond that which is explicitly or implicitly described by the following description and claims.

A need exists for a device and method that allows to compute percentile values of network monitoring data spawning multiple orders of magnitude at a high resolution using reduced computational power and memory. Some aspects of disclosure provide embodiments of such systems and methods.

In accordance with one aspect, there is provided a computer-implemented network monitoring method, the method comprising: acquiring, by a processor, network traffic monitoring data over a designated sampling period from said network, the network traffic monitoring data comprising a plurality of packet-related time values extending from a lower order of magnitude to a higher order of magnitude; constructing, by the processor, a first histogram representative of said network traffic monitoring data comprising a first bin size and covering a range of said lower order of magnitude to said higher order of magnitude; identifying, by the processor, one or more bins of said first histogram comprising each at least one of one or more desired percentile values of said network traffic monitoring data; for each identified bin of said one or more bins of said first histogram: building, by the processor, a second histogram centered on said identified bin, said second histogram comprising a second bin size that is smaller than said first bin size; calculating, by the processor, one or more bins of said second histogram comprising each at least one of said one or more desired percentile values and the values associated therewith; and converting, for each of said second histogram, each of said values associated therewith into percentile values representative of the range defined between said lower order of magnitude to said higher order of magnitude.

In one embodiment, said building and said calculating is done recursively, wherein the said calculated one or more bins of said second histogram from a first iteration become the identified one or more bins of said first histogram in a following iteration.

In one embodiment, said building and said calculating is done recursively until the second bin size of the last iteration is smaller than a threshold.

In one embodiment, said building and said calculating is done recursively for a predetermined number of iterations.

In one embodiment, said packet-related time values comprises one of: round trip time, one-way delay or two-way delay.

In one embodiment, said building and said calculating is done in parallel for each identified bin.

In one embodiment, said building includes: subtracting from all packet-related time values the bin number of the identified bin of said first histogram multiplied by the first bin size; clipping all negative values obtained from said subtraction to a value of zero; and clipping all values greater than the first bin size obtained from said subtraction to a value of said first bin size.

In one embodiment, said converting comprises adding to each of said values associated therewith a multiplication of the weight of each identified bin with the corresponding bin number.

In one embodiment, the method further comprises the steps of: transmitting, by the processor, via said network, said one or more desired percentile values to a reporting system.

In one embodiment, said method is repeated according to a predetermined time interval.

In accordance with another aspect, there is provided a network monitoring device, the device comprising: one or more processors; a network module communicatively coupled to said one or more processors and configured to send and receive packets via a network; a memory storing instructions that, when executed by the one or more processors, configured the device to: acquire network traffic monitoring data over a designated sampling period from said network, the network traffic monitoring data comprising a plurality of packet-related time values extending from a lower order of magnitude to a higher order of magnitude; construct a first histogram representative of said network traffic monitoring data comprising a first bin size and covering a range of said lower order of magnitude to said higher order of magnitude; identify one or more bins of said first histogram comprising each at least one of one or more desired percentile values of said network traffic monitoring data; for each identified bin of said one or more bins of said first histogram: build a second histogram centered on said identified bin, said second histogram comprising a second bin size that is smaller than said first bin size; calculate one or more bins of said second histogram comprising each at least one of said one or more desired percentile values and the values associated therewith; and convert each of said values associated therewith into percentile values representative of the range defined between said lower order of magnitude to said higher order of magnitude.

In one embodiment, said building and said calculating is done recursively, wherein the said calculated one or more bins of said second histogram from a first iteration become the identified one or more bins of said first histogram in a following iteration.

In one embodiment, said building and said calculating is done recursively until the second bin size of the last iteration is smaller than a threshold.

In one embodiment, said building and said calculating is done recursively for a predetermined number of iterations.

In one embodiment, said packet-related time values comprises one of: round trip time, one-way delay or two-way delay.

In one embodiment, said building and said calculating is done in parallel for each identified bin.

In one embodiment, said building includes: subtracting from all packet-related time values the bin number of the identified bin of said first histogram multiplied by the first bin size; clipping all negative values obtained from said subtraction to a value of zero; and clipping all values greater than the first bin size obtained from said subtraction to a value of said first bin size.

In one embodiment, said converting comprises adding to each of said values associated therewith a multiplication of the weight of each identified bin with the corresponding bin number.

In one embodiment, said instructions further configure the device to: transmit said one or more desired percentile values to a reporting system via said network.

In one embodiment, said instructions are repeated according to a predetermined time interval.

BRIEF DESCRIPTION OF THE DRAWINGS

Several embodiments of the present disclosure will be provided, by way of examples only, with reference to the appended drawings, wherein.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all the features of any one apparatus or process described below or to features common to multiple or all the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

The device and method described herein provide, in accordance with different embodiments, different examples in which network monitoring statistics, namely percentile values of packet-related time values, may be computed using reduced computational power and memory for large datasets comprising values spawning multiple orders of magnitude at a high-resolution. Thus, the examples below provide for an improved network monitoring capability that would not be possible using the devices and/or techniques commonly known in the art.

Figure 1:
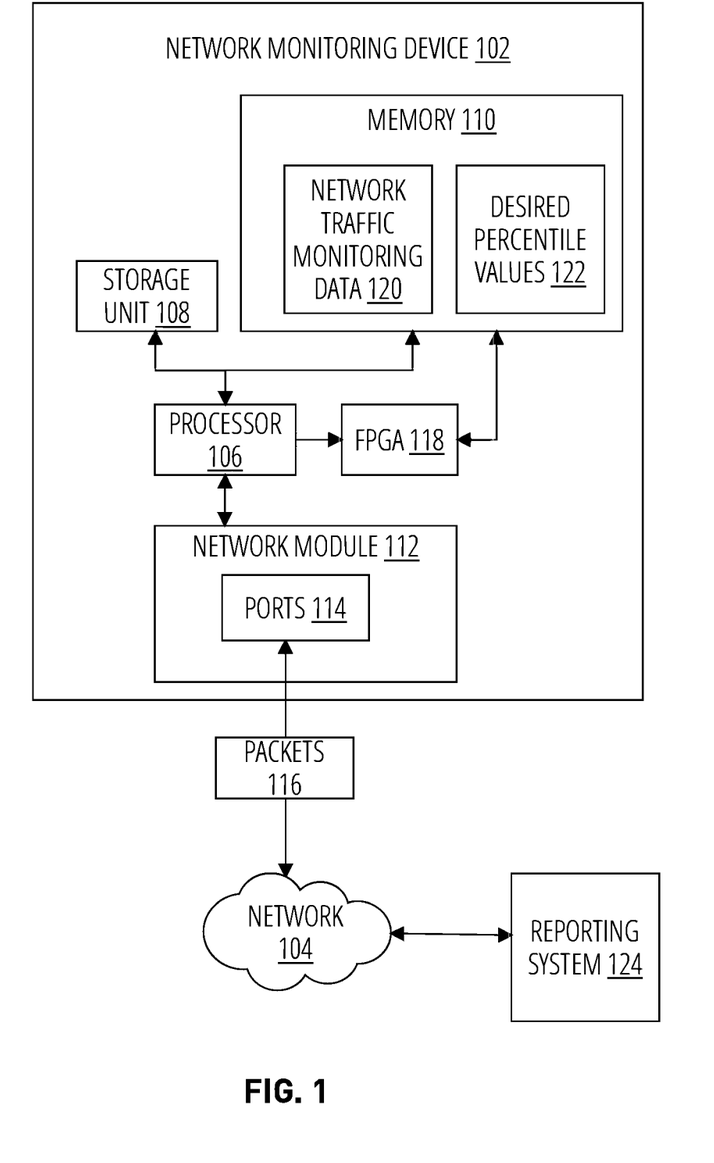
FIG. 1 is a schematic diagram a network monitoring device, in accordance with one embodiment.

FIG. 1 is a schematic diagram of an exemplary network monitoring device 102, in accordance with one embodiment. The network monitoring device 102 is typically configured to be coupled or connected to a network 104 so as to monitor in real-time network traffic in passing through said network and/or measure various metrics related thereto. In this example, the device 102 is shown comprising one or more processors 106 communicatively coupled to a data storage unit 108 (e.g., hard-disk or solid-state memory or other), a memory 110 (e.g., non-volatile memory such as random-access memory (RAM) or the like), a network module 112. The network module 112 comprises one or more ports 114, for example ethernet ports, so as to receive and send a plurality of network packets 116 therefrom.

In addition, the device 102 comprises a Field Programmable Gate Array (FPGA) processor 118 (or just FPGA 118), which is specifically configured, at least in part, to process the network traffic monitoring data 120 measured or collected in the memory 110 by the device 102 over a designated sampling period. The FPGA 118 typically comprises one or more computing cores and its own internal memory.

As an example only, in one embodiment, the network monitoring device 102 may take the form of the Accedian Skylight Flex 100 ethernet platform family of products or the like. These include, for example, quad 100 Gbe ports (QSFP28) and are designed for high-bandwidth and high availability applications requiring MEF-type service assurance. They are configured to provide tools to establish, validate, and monitor Layer 2 and Layer 3 services in a single unit, and supports real time metrics collection and reporting. However, the skilled person in the art will appreciate that, in some embodiments, different implementations of the network monitoring device 102 as described herein may be used as well.

The network traffic monitoring data 120 typically comprises a plurality of samples of various delays measured by the network monitoring device 102. These may include, for example but without limitation, metrics such as round trip time, one-way delay or two-way delay. The measurement of such metrics is known in the art. However, due to the very large amount of data collected or measured, statistics are typically generated to better characterize the network traffic monitoring data 120 and these statistics are provided to the network administrators and/or service providers to diagnose problems or issues, or more generally assess the performance of the network and/or the individual services being provided via said network.

As written above, one type of statistics includes various percentile values characterizing these metrics (e.g., the desired percentile values 122). These are typically noted using the capital number P (e.g., P95 is the 95th percentile). However, as noted above, generating or computing such percentile values at a high temporal resolution (of the order of 1 µs for example) but over large sampling periods (of the order of 1 second) is challenging due to the limited computational power and memory of FPGAs. In addition, reporting of such computed percentile values is usually done periodically (for example every 15 minutes) thus presenting further time limitations. As noted above, current methods use in the art, for example using a sort algorithm or building a single full histogram, are typically too computationally demanding and/or too slow. The methods described below, in accordance with various embodiments, thus allow to compute such statistics using reduced computational power and memory and thus allows to provide improved network monitoring.

While the methods described below, in accordance with different embodiments, are typically executed on the FPGA 118 due to computational speed requirements as explained above, the skilled person in the art will appreciate that other embodiments may use other processing means, alone or in combination with the FPGA 118, for example the one or more processors 106.

In some embodiments, the network monitoring device 102 is further communicatively coupled to a reporting system 124. This reporting system 124 may comprise, for example, servers (e.g., cloud-server) and/or third-party networked computing devices, that receive and store the desired percentile values may be readily retrievable by a network administrator and/or service provider.

Figure 2:
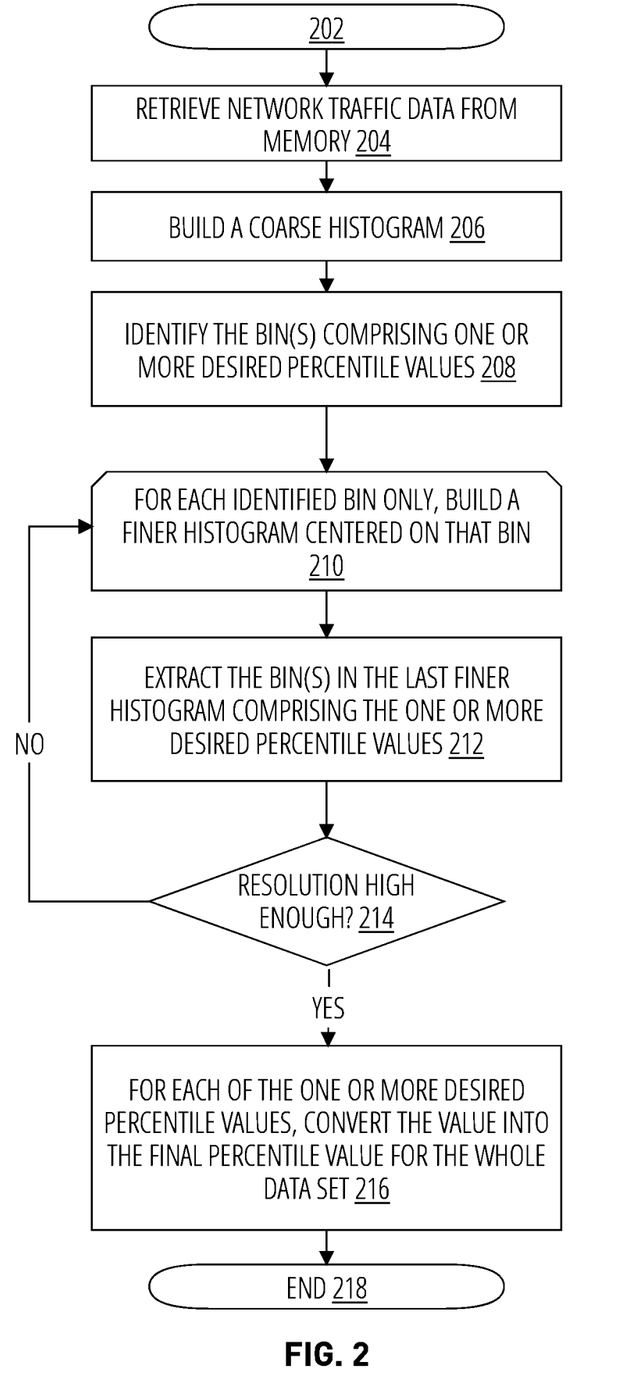
FIG. 2 is a process flow diagram of as executed by the device of FIG. 1, in accordance with one embodiment.

FIG. 2 illustrates a method for improved characterization of network traffic data that allows to compute one or more percentile values from network traffic monitoring data 120 over a designated sampling period. In this example, the method starts at step 202, usually when the device 102 has finished measuring or accumulating the plurality of samples of said data. This may be determined via a monitoring time delay (e.g., every 15 minutes) that is repeated periodically. In other embodiments, step 202 may be initiated upon the device 102 receiving instructions to do so via said network 104. In one example, the network traffic monitoring data 120 may comprise samples comprising values (e.g., delay values or other) covering a range of many orders of magnitude, for example 0 µs to 999999 µs (i.e., a wide range of 1 second and a fine resolution of 1 µs).

At step 204, the network traffic monitoring data 120 is retrieved from memory 110 and sent to the FPGA 118 for processing.

A step 206, a first coarse or low-resolution histogram representative of the network traffic monitoring data 120 over said sampling range or period is constructed or built by the FPGA 118. Any algorithm for constructing histograms known in the art may be used, without limitation. In the example noted above, the first coarse histogram may have for instance 1024 bins so that each bin represents 1024 µs so as to cover the range of 1 second and more. In this example, using a power of 2 simplifies the logic compared to using a decimal-based number of bins (e.g., 1000 bins of 1000 µs each to cover the exact 1 second range), but other parameters for determining the number of bins may also be used, without exception.

At step 208, each bin of the coarse histogram comprising one or more of the desired percentile values are identified (for example M bins). This is done using known algorithms in the art. Examples of often-used percentile values include, without limitation: P10, P25, P50, P75, P95, P96, P98, and P99. For example, if the P95 extracted from the coarse histogram is in the bin #30, this mean the P95 is between 30*1024 µs inclusive and 31*1024 µs exclusive.

At step 210, for each of the identified bins, and only for these identified bins, a new higher-resolution or finer histogram is built or constructed within the boundaries of that bin (e.g., M new finer histograms). These finer histograms have a smaller bin size (i.e., higher resolution) than the previous coarser histograms. Different numbers of bins or bin sizes may be used, without restriction. Typically, the selection of the finer bin sizes may be based on various parameters, for example available computational power and memory. In some embodiments, each finer histogram will have a same number of bins and smaller bin size. Again any histogram building algorithm may be used, without limitation.

In the example discussed above (P95 being in the 30th bin), the finer histogram may be built so as to cover 1024 µs centered on a 30*1024 µs to 31*1024-1 µs range. To build the fine histogram covering 1024 µs (~1 ms), the coarse value of 30*1024 µs may be subtracted from all data samples and the result value below zero clipped to 0 µs and the result value greater than 1023 clipped to 1023 µs.

In some embodiments, building each finer or higher-resolution histogram may first require the FPGA 118 to retrieve the network traffic monitoring data 120 again from memory 110. In some embodiments, each finer histogram (for each identified bin), or at least a portion thereof, may be constructed in parallel on the FPGA 118, thus reducing the need to fetch the network traffic monitoring data 120 to build each one. In some embodiments, building the finer histograms may be done in parallel or in series, or a mix of the two.

At step 212, for each of the X finer histograms, the bins comprising one or more desired percentile values are computed or identified.

At step 214, if the time resolution of the finer histograms is deemed or evaluated to be higher than a threshold value, then the method continues to step 216 (described below). If the resolution of the finer histograms is not high enough, then the method goes back to step 210, wherein for each of the computed bins comprising one or more desired percentile in the finer histograms, a new even higher-resolution or finer histogram is constructed or built. Thus steps 210-214 may be done in a recursive fashion, wherein the identified bins in a given iteration are expanded into a finer histogram in the next iteration. Since only bins comprising at least one desired percentile value are expanded into a finer histogram at each iteration, the memory necessary to get the higher resolution values is reduced. In some embodiments, steps 210-214 may be repeated as long as the resolution of the lastly constructed histograms is not fine enough. In other embodiments, a fixed number of iterations may be chosen instead (e.g., 1, 2, 3 iterations, etc.).

At step 216, the percentile values identified at the last iteration of step 212 are converted into a final percentile value for the whole data set. This may be done, for example, by adding to the lastly identified value corresponding to a desired percentile, for each histogram iteration, starting from the finest level to the coarsest one, the multiplication of the weight of each bin by the bin number (e.g., if only a single finer histogram is used, then the bin value of the finer histogram is added to the multiplication of the corresponding coarse bin value times the width of that coarse bin value).

Thus, in the example given above, where only 1 coarse histogram and 1 finer histogram was used, the bin corresponding to P95 value from the finer histogram is identified (and the associated value) and a coarse offset of 30*1024 μs is added to this value to get the real P95 value with a precision of 1 μs.

The method ends at step 218. In some embodiments, a further step of transmitting, by the network monitoring device 102, the desired one or more desired percentile values 122 to a second network device (e.g., the reporting system 124 or the like) may also be performed.

Figure 3:
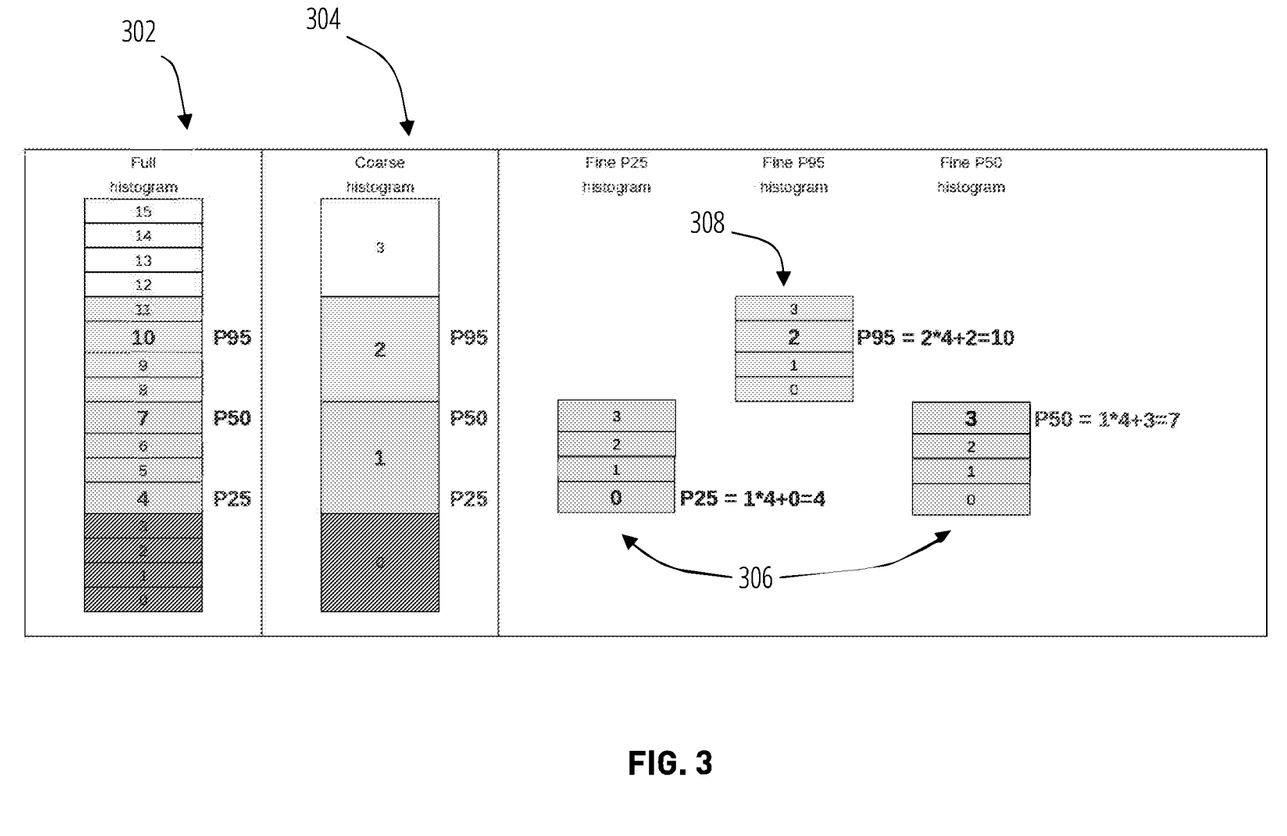
FIGS. 3 and 4 are a schematic diagram illustrating some of the method steps of the method of FIG. 2, in accordance with one embodiment.
Figure 4:
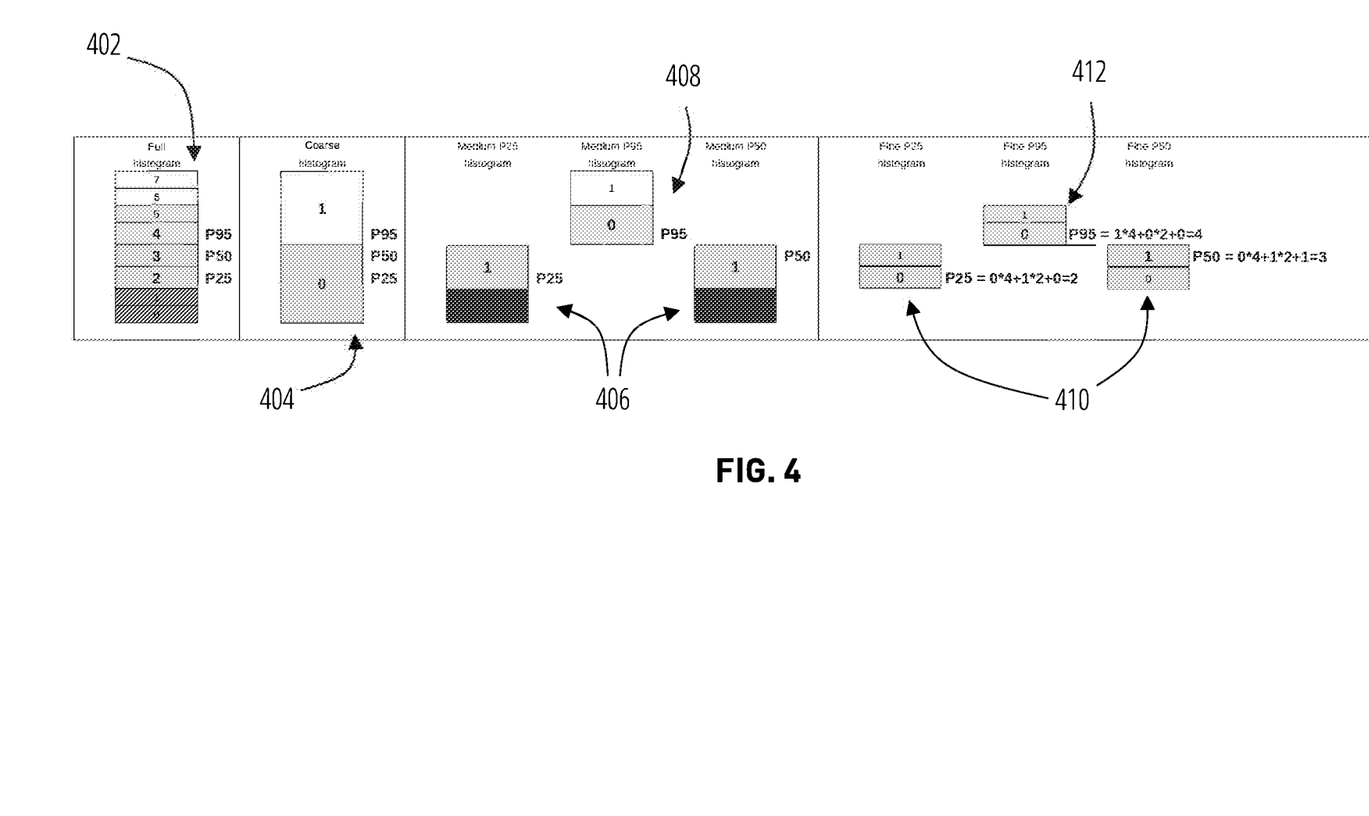

FIGS. 3 and 4 show schematic diagrams illustrating some of the method steps discussed above, using simple examples. In the example of FIG. 3, a full histogram 302 is shown on the left, and on the right an example is shown of how the same percentile values (P25, P50 and P95—e.g., the 25th, 50th and 95th percentile values, respectively) can be computed using a coarse histogram and two fine histograms.

In this example, the coarse histogram 304 comprises, as an example only, 4 bins (labeled 0 to 3). As mentioned above, the bin or bins of the coarse histogram comprising within their boundaries one or more desired percentile values are identified (e.g., step 208). In the example of FIG. 3, the bins having these values are identified as bin 1 (which has P25 and P50) and bin 2 (which has P95).

For each of the two bins having at least one desired percentile values (here bins 1 and 2), a fine histogram centered on each bin is built (e.g., step 210). These are shown as histograms 306 (corresponding to bin 1 of histogram 304) and histogram 308 (corresponding to bin 2 of histogram 304). In this example, the same number of bins was used for the coarse and finer histograms (4 bins).

The lowest bin of a fine histogram (e.g., histograms 304 or 306) counts data in its bin and all data that would be in a lower bin if the histogram would have more bins. The highest bin of the fine histogram counts data that match its bin and all data that would be in a higher bin if the histogram would have more bins. Thus, the bins in each finer histogram comprising the desired percentile values are extracted or calculated (e.g., step 212). In the current example, bin 0 and 3 of histogram 306 are found to have P25 and P50, respectively, while bin 2 of histogram 308 has P95.

In this example, the method is stopped after a single refinement iteration, and the identified values in the finer histograms are converted so as to representative of the whole data set. As mentioned above, to each value in the finer histogram (e.g., the bin number corresponding to the desired percentile) is added the multiplication of the bin weight or width with the corresponding bin number of the coarse histogram.

Assuming for this example that the width or weight of each bin of the finer histograms is equal to 1 μs, then the P95, P50 and P25 values in this example correspond to:

P25: (fine bin number+coarse bin number*width of coarse bin number)=0+1*4=4 μs;

P50: 3+1*4=7 μs; and

P95: 2+2*4=10 μs.

It can easily be seen that these values correspond to the values that would have been computed using the full histogram 302.

FIG. 4 shows another example, similar to the one of FIG. 3, but where the process of building a finer histogram is repeated twice. Thus three different levels of histograms are used (here named coarse, medium and fine as an example only).

In this example, the data spawns a range of 0 to 8 μs. Thus, a full histogram (histogram 402) having a bin size of 1 μs would have correspondingly 8 bins. Here, a coarse histogram 404 is first constructed comprising only 2 bins (0 and 1). P25 and P50 located within bin 0, while P95 is within bin 1. Thus, for each bin 0 and 1 of the coarse histogram, a finer histogram is built (called the medium histograms 406 and 408 respectively). These again comprises 2 bins (also numbered 0 and 1). Both P25 or P50 are found to be within bin 1 of the medium histogram 406, while P95 is within bin 0 of the medium histogram 408.

In this example, the process of building another set of finer histograms is repeated a second time, so that bin 1 of medium histogram 406 is expanded into a fine histogram 410, while bin 0 of medium histogram 408 is expanded into fine histogram 412. P25 and P50 are found to be within bin 0 and bin 1 of the fine histogram 410 respectively, while P95 is found within bin 0 of the fine histogram 412. The process is stopped at this level or resolution, so that the final values can be extracted. Thus, to the bin number of the fine histogram is added the corresponding bin number of the medium histogram multiplied by the medium bin size, and the corresponding bin number of the coarse histogram multiplied by the coarse bin size.

For this example, we find, assuming that each bin in the full histogram has a width of 1 μs-thus covering a spawn of 1-8 μs:

P25: (fine bin number+medium bin number*width of medium bin number+coarse bin number*width of coarse bin number)=0+1*2+0*4=2 μs;

P50: 1+1*2+0*4=3 μs; and

P95: 0+0*2+1*4=4 μs.

A quick look at the full histogram 402 shows that the values found using the method described above gives the correct values, but at a reduced computational cost.

The skilled person in the art will appreciate that the method disclosed above may be used in other areas of technology as well. Any application that requires to compute a plurality of high-resolution percentile values from a data spawning multiple orders of magnitude may benefit from the above described method, in accordance with various embodiments. The advantages mentioned above, such as a reduced computational power and memory, and faster processing, will also be present, irrespective of the type of data being processed.

The present disclosure includes systems having processors to provide various functionality to process information, and to determine results based on inputs. Generally, the processing may be achieved with a combination of hardware and software elements. The hardware aspects may include combinations of operatively coupled hardware components including microprocessors, logical circuitry, communication/networking ports, digital filters, memory, or logical circuitry. The processors may be adapted to perform operations specified by a computer-executable code, which may be stored on a computer readable medium.

The steps of the methods described herein may be achieved via an appropriate programmable processing device or an on-board field programmable gate array (FPGA) or digital signal processor (DSP), that executes software, or stored instructions. In general, physical processors and/or machines employed by embodiments of the present disclosure for any processing or evaluation may include one or more networked or non-networked general purpose computer systems, microprocessors, field programmable gate arrays (FPGA's), digital signal processors (DSP's), micro-controllers, and the like, programmed according to the teachings of the exemplary embodiments discussed above and appreciated by those skilled in the computer and software arts. Appropriate software can be readily prepared by programmers of ordinary skill based on the teachings of the exemplary embodiments, as is appreciated by those skilled in the software arts. In addition, the devices and subsystems of the exemplary embodiments can be implemented by the preparation of application-specific integrated circuits, as is appreciated by those skilled in the electrical arts. Thus, the exemplary embodiments are not limited to any specific combination of hardware circuitry and/or software.

Stored on any one or a combination of computer readable media, the exemplary embodiments of the present invention may include software for controlling the devices and subsystems of the exemplary embodiments, for driving the devices and subsystems of the exemplary embodiments, for processing data and signals, for enabling the devices and subsystems of the exemplary embodiments to interact with a human user or the like. Such software can include, but is not limited to, device drivers, firmware, operating systems, development tools, applications software, and the like. Such computer-readable media further can include the computer program product of an embodiment of the present invention for preforming all or a portion (if processing is distributed) of the processing performed in implementations. Computer code devices of the exemplary embodiments of the present invention can include any suitable interpretable or executable code mechanism, including but not limited to scripts, interpretable programs, dynamic link libraries (DLLs), complete executable programs and the like.

Common forms of computer-readable media may include, for example, magnetic disks, flash memory, RAM, a PROM, an EPROM, a FLASH-EPROM, or any other suitable memory chip or medium from which a computer or processor can read.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the present disclosure.

What is claimed is:

1. A computer-implemented network monitoring method, the method comprising:
    acquiring, by a processor, network traffic monitoring data from a network, the network traffic monitoring data comprising a plurality of packet-related time values extending from a lower order of magnitude to a higher order of magnitude;
    constructing, by the processor, a first histogram representative of said network traffic monitoring data comprising a first bin size and covering a range of said lower order of magnitude to said higher order of magnitude;
    identifying, by the processor, one or more bins of said first histogram comprising each at least one of one or more desired percentile values of said network traffic monitoring data;
    for each identified bin of said one or more bins of said first histogram:
        building in a recursive manner, by the processor, one or more refined histograms, starting with said identified bin and wherein a bin of a refined histogram of a current iteration is used as the identified bin for a next iteration; and
        calculating, by the processor, one or more bins of said one or more refined histograms comprising each at least one of said one or more desired percentile values and the packet-related time values associated therewith; and
    converting each of said packet-related time values associated therewith into percentile values representative of the range defined between said lower order of magnitude to said higher order of magnitude.

2. The method of claim 1, wherein said building and said calculating are done recursively until a bin size of a last iteration is smaller than a threshold, said threshold based on available computational power and memory of said processor.

3. The method of claim 1, wherein said building and said calculating are done recursively for a predetermined number of iterations.

4. The method of claim 1, wherein said packet-related time values comprises one of: round trip time, one-way delay or two-way delay.

5. The method of claim 1, wherein said building and said calculating are done in parallel for each identified bin.

6. The method of claim 1, wherein said building includes:
    subtracting from all packet-related time values a bin number of the identified bin of said first histogram multiplied by the first bin size;
    clipping all negative values obtained from the subtracting to a value of zero; and
    clipping all values greater than the first bin size obtained from the subtracting to a value of said first bin size.

7. The method of claim 1, wherein said converting comprises adding to each of said packet-related time values associated therewith a multiplication of a weight of each identified bin with a corresponding bin number.

8. The method of claim 1, further comprising:
    transmitting, by the processor, via said network, said one or more desired percentile values to a reporting system.

9. The method of claim 1, wherein said method is repeated according to a predetermined time interval.

10. A network monitoring device comprising:
one or more processors;
a network module communicatively coupled to said one or more processors and configured to send and receive packets via a network;
a memory storing instructions that, when executed by the one or more processors, configured the network monitoring device to:
acquire network traffic monitoring data from said network, the network traffic monitoring data comprising a plurality of packet-related time values extending from a lower order of magnitude to a higher order of magnitude;
construct a first histogram representative of said network traffic monitoring data comprising a first bin size and covering a range of said lower order of magnitude to said higher order of magnitude;
identify one or more bins of said first histogram comprising each at least one of one or more desired percentile values of said network traffic monitoring data;
for each identified bin of said one or more bins of said first histogram:
building in a recursive manner one or more refined histograms, starting with said identified bin and wherein a bin of a refined histogram of a current iteration is used as the identified bin for a next iteration; and
calculating one or more bins of said one or more refined histograms comprising each at least one of said one or more desired percentile values and the packet-related time values associated therewith; and
convert each of said packet-related time values associated therewith into percentile values representative of the range defined between said lower order of magnitude to said higher order of magnitude.

11. The device of claim 10, wherein said building and said calculating are done recursively until a bin size of a last iteration is smaller than a threshold, said threshold based on available computational power and memory of said one or more processors and memory, respectively.

12. The device of claim 10, wherein said building and said calculating are done recursively for a predetermined number of iterations.

13. The device of claim 10, wherein said packet-related time values comprises one of: round trip time, one-way delay or two-way delay.

14. The device of claim 10, wherein said building and said calculating are done in parallel for each identified bin.

15. The device of claim 10, wherein said building includes:
subtracting from all packet-related time values a bin number of the identified bin of said first histogram multiplied by the first bin size;
clipping all negative values obtained from the subtracting to a value of zero; and
clipping all values greater than the first bin size obtained from the subtracting to a value of said first bin size.

16. The device of claim 10, wherein said converting comprises adding to each of said packet-related time values associated therewith a multiplication of a weight of each identified bin with a corresponding bin number.

17. The device of claim 10, wherein said instructions further configure the device to:
transmit said one or more desired percentile values to a reporting system via said network.

18. The device of claim 10, wherein said instructions are repeated according to a predetermined time interval.

19. A non-transitory computer-readable medium storing instructions that, when executed by a processor, causes a network monitoring system coupled to a network to:
acquire network traffic monitoring data from said network, the network traffic monitoring data comprising a plurality of packet-related time values extending from a lower order of magnitude to a higher order of magnitude;
construct a first histogram representative of said network traffic monitoring data comprising a first bin size and covering a range of said lower order of magnitude to said higher order of magnitude;
identify one or more bins of said first histogram comprising each at least one of one or more desired percentile values of said network traffic monitoring data;
for each identified bin of said one or more bins of said first histogram:
build in a recursive manner one or more refined histograms, starting with said identified bin and wherein a bin of a refined histogram of a current iteration is used as the identified bin for a next iteration; and
calculate one or more bins of said one or more refined histograms comprising each at least one of said one or more desired percentile values and the packet-related time values associated therewith; and
convert each of said packet-related time values associated therewith into percentile values representative of the range defined between said lower order of magnitude to said higher order of magnitude.

* * * * *